United States Patent [19]

Bafford et al.

[11] Patent Number: 4,931,495

[45] Date of Patent: Jun. 5, 1990

[54] NON-AQUEOUS DISPERSION POLYMERIZATION

[75] Inventors: Richard A. Bafford, Aiken, S.C.; George E. Faircloth, Augusta, Ga.; Hseuh C. Lee, Baton Rouge, La.

[73] Assignee: Air Products and Chemicals, Inc., Allentown, Pa.

[21] Appl. No.: 96,656

[22] Filed: Sep. 15, 1987

[51] Int. Cl.$^5$ ................................................ C08F 2/16
[52] U.S. Cl. ................................ 524/460; 524/458
[58] Field of Search ................................ 524/460, 458

[56] References Cited

U.S. PATENT DOCUMENTS

| | | | |
|---|---|---|---|
| 3,786,116 | 1/1974 | Milkovich et al. | 525/276 |
| 3,842,050 | 10/1974 | Milkovich et al. | 526/173 |
| 3,842,057 | 10/1974 | Milkovich et al. | 526/173 |
| 3,842,059 | 10/1974 | Milkovich et al. | 526/173 |
| 3,862,077 | 1/1975 | Schulz et al. | 524/460 |
| 4,009,138 | 2/1977 | Kobashi et al. | 524/460 |
| 4,064,087 | 12/1977 | Das | 524/460 |
| 4,337,185 | 6/1982 | Wessling et al. | 524/460 |
| 4,426,483 | 1/1984 | Maslanka et al. | 524/460 |
| 4,427,819 | 1/1984 | Wessling et al. | 524/460 |
| 4,507,425 | 3/1985 | Weaver | 524/460 |
| 4,530,956 | 7/1985 | Ugelstad et al. | 524/460 |
| 4,551,388 | 11/1985 | Schlademan | 428/355 |
| 4,554,324 | 11/1985 | Husman et al. | 525/301 |
| 4,656,213 | 4/1987 | Schlademan | 524/272 |

FOREIGN PATENT DOCUMENTS

| | | | |
|---|---|---|---|
| 0139151 | 8/1982 | Japan | 524/460 |
| 0139152 | 8/1982 | Japan | 524/460 |
| 2064814 | 3/1987 | Japan | 524/460 |

*Primary Examiner*—Joseph L. Schofer
*Assistant Examiner*—J. M. Reddick
*Attorney, Agent, or Firm*—Michael Leach; James C. Simmons; William F. Marsh

[57] ABSTRACT

A non-aqueous despersion polymer having high solids content and substantial adhesives properties is prepared by copolymerizing a selected monomer with a polymeric monomer and a polar monomer in an organic diluent to produce an insoluble polymer dispersed in the organic phase.

20 Claims, No Drawings

NON-AQUEOUS DISPERSION POLYMERIZATION

BACKGROUND OF THE INVENTION

1. Field of the Invention

The present invention relates generally to a process for preparing a polymer composition for use as a coating or adhesive. More particularly, the invention relates to a process for preparing a low viscosity, high molecular weight non-aqueous dispersion polymer with improved shear strength for use as a coating or adhesive.

2. Description of the Prior Art

Over the past three decades, a significant body of knowledge has been developed on the emulsion polymerization of unsaturated molecules where the continuous phase is water. These emulsion polymers now constitute the base for water-borne coatings, adhesives, binders and paints. The benefits of water as the continuous medium are that it is non-flammable, nontoxic, free of odor and inexpensive. Nevertheless, water has the disadvantage of high heat of evaporation compared to organic solvents resulting in greater energy requirements to dry water-borne coatings. In addition, water-borne coatings are sensitive to irreversible damage by freezing, they cause grain rising when applied to wood and they cause rust when applied to unprotected ferrous metals. Furthermore, emulsion polymerization requires the presence of stabilizers, primarily surfactants which can adversely affect the end use performance of the polymer. The surfactants tend to make the resultant coating or polymeric film water sensitive compared to an identical coating or polymeric film from a solvent based coating.

While solvent-borne coatings and adhesives do not suffer these disadvantages, they also have certain limitations. In general, coating and adhesive compositions require a polymer of high molecular weight. However, the viscosity of such polymer solutions rises sharply with concentration and molecular weight of the dissolved polymer. For example, a 50% solids aqueous emulsion of a polymer, having a molecular weight of one million or more can have a viscosity of less than 100 centipoise, whereas the same polymer dissolved in a solvent would be a virtual gel with 50% dissolved solids. Consequently, in order to have a solvent-borne coating solution with low viscosity, the solids content of the solution must be around 30%. The disadvantage in this case is that the molecular weight of the dissolved polymer will be one or two orders of magnitude lower than that of the emulsion polymer. To compensate for the lower molecular weight coating, typically such polymers will contain functional groups which will crosslink with themselves or with additives when the coating is dried and/or baked. The disadvantage of crosslinking is that it can produce brittle, non-extensible films. The formulator of coatings is constantly faced with trading off of one property for another. If the coating must have some extensibility, for example, in the case of an exterior paint subject to wide temperature fluctuations, crosslinking must be limited and the tensile strength of the film will be lower.

It has been recognized that a non-aqueous dispersion polymer would have many of the advantages of both water-borne and solvent-borne coatings. These advantages include: (a) high solids coatings at low viscosities, (b) high molecular weight polymers without resorting to extensive crosslinking, and (c) elimination of water sensitivity such as grain raising and film plasticization by moisture.

A number of dispersion polymerizations of acrylic esters and methacrylic esters in organic continuous phases have been reported. The desired monomers, i.e., (meth) acrylic esters, are polymerized in a suitable organic continuous phase in the presence of a dispersant. The dispersant is generally a block or graft copolymer of two components, one soluble in and the other insoluble in the continuous phase.

These dispersion polymerizations, while improving the overall properties of the coating, have not been completely successful in achieving many of the advantages of both water-borne and solvent-borne coatings.

SUMMARY OF THE INVENTION

It is the object of the present invention to provide a process for preparing a non-aqueous dispersion polymer which has many of the advantages of both water-borne and solvent-borne coatings.

Another object of the invention is to provide a process for preparing a non-aqueous dispersion copolymer having high solids content, low viscosity and substantial adhesive properties.

To this end, the present invention provides a process for preparing a stable dispersion of polymers within an organic diluent in which the monomers are soluble and its polymers are insoluble. The process is concerned with copolymerizing a selected monomer with minor amounts of a polymeric monomer and a polar monomer in the organic diluent to produce an insoluble polymer dispersed in the organic continuous phase. The polymerization process is effected by the addition of an initiator to a homogeneous mixture of monomers in the diluent in the absence of graft or block copolymers. The formed polymer particles are stabilized in the diluent by polar groups on the surface of the polymer particles.

DETAILED DESCRIPTION OF THE PREFERRED EMBODIMENT

As has been previously indicated, the process of the present invention is directed to the preparation of stable, non-aqueous, non-settling dispersion polymers for use as coatings or adhesives. Polymers for such applications must fulfill the requirements of low viscosity, high molecular weight and high shear strength.

In accordance with the present invention, a selected monomer is polymerized and copolymerized with minor amounts of a polymeric monomer and a polar monomer in the presence of an initiator and in the absence of graft copolymers to form dispersion polymers in an organic diluent.

Selected monomers which are adapted to be converted into dispersed polymers and copolymers by the polymerization process of the present invention may be selected from a wide variety of monomers, and preferably monomers which are capable of polymerizing by a free radical addition polymerization mechanism. These selected monomers include esters of acrylic acid, methacrylic acid or maleic acid, vinyl acetate, acrylonitrile, methacrylonitrile, and the like.

The polymeric monomers of the present invention are not graft or block copolymer dispersants as in classical dispersion polymerizations. Instead they are low to medium molecular weight, about 4,000 to 50,000 homopolymers terminated at one end with a functional group capable of copolymerizing with the selected monomers which polymerize by the free radical addition process. Unlike graft or block copolymer dispersants which are physically absorbed on the dispersed polymer particle and which are removable by extraction, the polymeric monomer of the present invention copolymerizes with the selected monomer to form part of the backbone of the dispersed polymers and cannot be extracted from the dispersed polymer.

Briefly, these macromolecular monomers are prepared by the anionic polymerization of polymerizable monomers to form a living polymer which is thereafter terminated by reaction with a halogen containing compound having a polymerizable moiety. Monomers capable of anionic polymerization are well-known and include the following non-limiting illustrative species:

vinyl aromatic compounds, such as styrene, alphamethylstyrene, vinyl toluene and its isomers; vinyl unsaturated amides such as acrylamide, methacrylamide, N,N-dimethyl acrylamide; acenaphthalene; 9-acrylcarbazole; acrylonitrile and methacrylonitrile; organic isocyanates including lower alkyl, phenyl, lower alkyl phenyl and halophenyl isocyanates, organic diisocyanates including lower alkylene, phenylene and tolylene diisocyanates; lower alkyl and allyl acrylates and methacrylates, including methyl, t-butyl acrylates and methacrylates; lower olefins, such as ethylene, propylene, butylene, isobutylene, pentene, hexene, etc.; vinyl esters of aliphatic carboxylic acids such as vinyl acetate, vinyl propionate, vinyl octoate, vinyl oleate, vinyl stearate, vinyl benzoate; vinyl lower alkyl ethers, vinyl pyridines, vinyl pyrrolidones; dienes including isoprene and butadiene.

The initiators for these anionic polymerizations are any alkali metal hydrocarbons and alkoxide salts which produce a mono-functional living polymer, i.e., only one end of the polymer contains a reactive anion.

Suitable halogen-containing terminating agents include:

the vinyl haloalkyl ethers wherein the alkyl groups contain six or fewer carbon atoms such as methyl, ethyl, propyl, butyl, isobutyl, secbutyl, amyl or hexyl; vinyl esters or haloalkanoic acids wherein the alkanoic acid contains six or fewer carbon atoms, such as acetic, propanoic, butyric, pentamoic, or hexanoic acid; olefinic halides having six or fewer carbon atoms such as vinyl halide, allyl halide, methallyl halide, 6-halo-1-hexene, etc.,; halides of dienes such as 2-halo-methyl-1,3-butadiene, epihalohydrins, acrylyl and methacrylyl halides, haloalkylmaleic anhydrides; haloalkylmaleate esters; vinyl haloalkylsilanes; vinyl haloaryls; and vinyl haloalkaryls, such as vinylbenzyl chloride (VBC) and haloalkyl norbornenes, such as bromoethyl norbornene.

The preferred polymeric monomers are acrylate or methacrylate esters of polystyryl alcohol e.g. polystyryl monomethacrylate, etc., where the molecular weight of the polystyryl alcohol is in the range of from about 4000 to 50,000. The actual preparation of these polymeric monomers is taught in U.S. Pat. Nos. 3,842,050, 3,842,057, 3,842,058, and 3,842,059, incorporated by reference herein. These polymeric monomers are also available commercially through Arco Chemical Co., under the trademark macromers ™.

Organic diluents which may be used in the process of the invention are those which are aliphatic in nature and preferably polar, such as aliphatic ketones or alcohols. The diluent of the present invention thus differs from conventional dispersion polymerization processes where non-polar media is typically employed.

The organic diluent for the polymerization process is selected on the basis of suitable boiling point for the type of polymerization and initiator to be used since the dispersion polymerization is usually carried out under reflux conditions. Selection of the diluent should also be made to ensure that the polymer formed does not dissolve in the diluent and finally the choice of diluent should also be based on the end use requirements of the polymer dispersions when the evaporation rate of the diluent is important.

The polar monomers which are adapted to copolymerize with the selected monomer are those where polar group can form hydrogen bonds with the organic diluent. Suitable polar monomers include unsaturated acids such as acrylic, methacrylic, maleic and itaconic acids, aminoalkyl acrylates, hydroxyalkyl acrylates, aminoalkyl methacrylates, hydroxyalkyl methacrylates, and the like. It is believed that the polar monomer stabilizes the insoluble polymeric particle in the organic diluent by providing polar groups on the surface of the polymer particle which non-covalently bond to the diluent, e.g. hydrogen bonding.

The free-radical polymerization process employs a free radical catalyst of the azo or peroxygen type. Suitable commercially available catalysts include benzoyl peroxide, lauroyl peroxide, acetyl peroxide, azodiisobutyronitrile, etc.

In the polymerization process of the present invention several variations in procedure may be employed in which free radical type dispersion polymerization is effective. The simplest procedure involves a single stage bulk process wherein an initially homogeneous solution of monomer reactants in the organic diluent are polymerized to completion in a single stage. A second procedure, a feed process, involves an initial seed-stage in which a low solids polymer dispersion is produced by a single stage bulk process and polymerization is completed by the further addition of reactants to the seed-stage. The additional reactants may be added continuously to the seed-stage or as a series of distinct charges.

In the single stage bulk process, a solution of select monomers, polymeric monomers, polar monomers and initiator in an organic diluent are heated and stirred under reflux conditions in an inert atmosphere, e.g. nitrogen. After a short period, there is evidence of polymerization, i.e. there is a slight rise in viscosity of the mixture, before the mixture becomes opalescent due to the formation of small polymer particles precipitated from the solution. Polymerization of the remaining monomer then proceeds at an increased rate until the monomer concentration has fallen to a low level, typically 2–3%. Additional heating is then required to complete the polymerization. The single-stage bulk process generally leads to polymer dispersions having a wide distribution of particle sizes and is not suitable if an accurate control of particle size or molecular weight of the polymer is required as would be the case in polymeric coatings.

The preferred procedure is the feed process, wherein the monomer concentration can be maintained at about the same level throughout most of the polymerization process. The faster seed-stage of the feed process is similar to the single stage bulk process except that a only a low concentration of dispersion polymers of uniform particle size are initially produced. Controlled addition of feed consisting of further selected monomers, polymeric monomers, polar monomers, initiator and organic diluent continues the particle growth of the dispersion polymers formed in the initial seed-stage. Toward the conclusion of the polymerization process, no further monomers are added to the process and optionally additional organic solvents, e.g. aromatic hydrocarbons may be added to the dispersion.

The proportion of the selected monomer may be from 30 to 90% by weight, based on the total weight of the monomers to be dispersed in the organic diluent, preferably about 75–85%. The proportion of the polymeric monomer may be from 5 to 15% by weight of the monomers to be dispersed, preferably about 10% and the polar monomer may comprise 5 to 10% by weight, preferably about 5%.

In an alternate embodiment, two or more selected monomers may be employed in the composition in addition to the polymeric monomer and polar monomers within the confines of the above proportions. Specifically, a second selected monomer, e.g. vinyl acetate, may be used to replace a portion of a first selected monomer, e.g. ethylhexyl acrylate, provided that the combined weight of selected monomers is in the range of 30 to 90% by weight of the total weight of the monomers to be dispersed.

Finally, an aromatic hydrocarbon may be used to replace a portion of the aliphatic diluent. Toluene, in particular, has been found to be a good substitute for aliphatic ketones.

In practicing the process of the present invention, the amount of monomers dispersed within the organic diluent may range from 1 to 70% by weight, based on total weight of monomers and diluent, preferably from about 30% to 70%, most preferably about 60%. A small amount of free-radical initiator is added to the homogeneous mixture of dispersed monomers in the range of 0.1 to 1.0% by weight, based on the total weight of monomers. The dispersion temperature is then raised under an inert atmosphere to commence the polymerization process. The dispersion temperature is maintained at a temperature selected to provide the desired solids content polymeric product until the monomers are essentially consumed. The polymerization reaction may be carried out at any controllable temperature from room temperature up to about 200° F. The dispersion temperature may then be raised for an additional period of time to ensure complete polymerization.

The invention is described in furthur detail by the following examples, which are provided for the purposes of illustration only and are not intended to be limiting.

EXAMPLE 1

A dispersion polymer reaction was conducted in a 1 liter vessel equipped with a paddle stirrer, thermometer, reflux condenser and addition funnel. The condenser and funnel have suitable fittings so that a nitrogen atmosphere can be maintained in the vessel.

The following components were charged to the vessel as the initial seed stage:

| Component | Weight (g) |
| --- | --- |
| 2-ethylhexyl acrylate | 96.0 |
| acrylic acid | 5.7 |
| Chemlink TM 4500 | 11.3 |
| (methacrylate ester of polystyryl alcohol, sold by Arco Chemical Co.) | |
| Methyl ethyl ketone | 67.0 |
| Vazo TM 64 | 0.19 |
| (azodiisobutyronitrile, sold | |

-continued

| Component | Weight (g) |
| --- | --- |
| by DuPont Co.) | |

The following funnel charges were prepared for subsequent feeding:

| Charge | Component | Weight (g) |
| --- | --- | --- |
| F-1 | 2-ethyhexyl acrylate | 167.05 |
| | acrylic acid | 9.9 |
| | Chemlink TM 4500 | 19.7 |
| | methyl ethyl ketone | 129.0 |
| | Vazo TM 64 | 0.26 |
| F-2 | 2-ethylhexyl acrylate | 40.0 |
| | acrylic acid | 2.4 |
| | Chemlink TM 4500 | 4.7 |
| | methyl ethyl ketone | 64.0 |
| | Vazo TM 64 | 0.13 |
| F-3 | methyl ethyl ketone | 28.0 |
| | Vazo TM 64 | 0.35 |
| | toluene | 57.0 |
| F-4 | methyl ethyl ketone | 31.0 |
| | Vazo TM 64 | 0.35 |
| | toluene | 70.0 |

The seed-stage was charged into the vessel which was purged with nitrogen gas. The vessel was heated to about 170° F. with a hot water bath to commence polymerization which was evidenced by a sudden rise in temperature. The temperature was readjusted to 170° F. and the mixture held at that temperature for 20 minutes prior to introducing funnel charge F-1 to the mixture. Funnel charge F-1 was added over a one-hour period followed by the F-2 charge which was added over a ½ hour period. The mixture temperature was maintained at 170° F. for another hour before adding charges F-3 and F-4 over the next hour. The vessel temperature was then raised to about 180°–190° F. and held for one hour to ensure complete polymerization.

The resulting polymer composition was cooled and analyzed. The solids content of the milky dispersion was 47.7% and the viscosity was 300 cps (Brookfield, #3 spindle at 60 rpm). The polymer dispersion was coated on release paper and dried. The clear polymeric film was a pressure sensitive adhesive having a Williams plasticity of 1.77 mm.

EXAMPLES 2, 3 AND 4

The dispersion polymerization process of Example 1 was followed except that the polymerization temperature was varied as shown in Table I.

TABLE I

| Example | Polymerization Temperature °F. | % Solids | Viscosity | Plasticity |
| --- | --- | --- | --- | --- |
| 2 | 150 | 45.5 | 360 | 2.20 |
| 3 | 140 | 45.8 | 340 | 2.48 |
| 4 | 130 | 44.8 | 500 | 2.95 |

As expected, the molecular weight of the polymer, as measured by plasticity, increases as the temperature decreases. However, there is essentially no change in the viscosity of the dispersions, a clear indication that the polymers of this process are dispersions and not solutions.

EXAMPLES 5, 6 and 7

The dispersion polymerization reaction of Example 1 was followed except that the temperature was maintained at 140° F. and less diluent was used so as to obtain an increased solids content. The relative amounts of monomers were also varied slightly in the three examples to study the effect on stability. The properties of the dispersion polymer products are shown in Table II.

| Example | Monomer ratio (by weight) EHA/4500/AA | % Solids | Viscosity | Stability |
|---|---|---|---|---|
| 5 | 85/10/5 | 61.6 | 9,200 cps | stable dispersion |
| 6 | 86/10/4 | 57.6 | 10,900 | seperates into two phases |
| 7 | 87/10/3 | 58.3 | 9,300 | seperates into two phases | where EHA = 2-ethyl hexyl acrylate
4500 = Chemlink TM 4500 (polystyryl)
AA = acrylic acid It is clear from the above example that at least 5% of a carboxyl containing monomer is necessary to stabilize the polymer dispersion.

EXAMPLES 8, 9 and 10

The dispersion polymerization procedure of Example 1 was followed using the following seed and funnel charges:

|  | Kettle Charge | |
|---|---|---|
|  | 123.8 g | ethylhexyl acrylate |
|  | 7.3 g | acrylic acid |
|  | 14.6 g | Chemlink TM 4500 |
|  | 51.4 g | diluent |
|  | 0.08 g | Vazo TM 64 |
|  | Funnel Charges | |
| F-1 | 215.9 g | ethylhexyl acrylate |
|  | 12.8 g | acrylic acid |
|  | 25.7 g | Chemlink TM 4500 |
|  | 79.0 g | diluent |
|  | 0.23 g | Vazo TM 64 |
|  | 20.0 g | toluene |
| F-2 | 51.6 g | ethylhexyl acrylate |
|  | 3.1 g | acrylic acid |
|  | 6.1 g | Chemlink TM 4500 |
|  | 39.1 g | diluent |
|  | 0.12 g | Vazo TM 64 |
|  | 10.0 g | toluene |
| F-3 | 21.5 g | diluent |
|  | 0.28 g | Vazo TM 64 |
|  | 43.7 g | toluene |
| F-4 | 23.8 g | diluent |
|  | 0.32 g | Vazo TM 64 |
|  | 53.7 g | toluene |

The polymerization temperature for all three examples was maintained at 150° F. and the choice of diluent was varied as shown on Table III.

TABLE III

| Example | Diluent | % Solids | Viscosity | Appearance |
|---|---|---|---|---|
| 8 | Methyl ethyl Ketone | 58.9 | 13,000 cps | Milky |
| 9 | ethyl acetate | — | — | Clear Jelly |
| 10 | heptane | 50.0 | greater than 400,000 | Slightly Hazy |

It is clear from the above examples that proper selection of the organic diluent is important in preparing high molecular weight, low viscosity dispersion polymers.

EXAMPLE 11

A dispersion polymer was prepared by the process of Example 1 to produce a polymer having the following composition:
76.5 parts ethylhexyl acrylate
5.0 parts acrylic acid
10.0 parts Chemlink TM 4500
8.5 parts isooctyl acrylate The resultant polymeric dispersion had a 57.6% solids content, a viscosity of 28,800 cps and a plasticity of 3.47 mm.

EXAMPLE 12

A dispersion polymer suitable as a metal coating was prepared by the process of example 1 except that the ethylhexyl acrylate was replaced by butyl methacrylate. The viscosity of a 57% solids dispersion was 14,400 cps.

When the same polymer was prepared using cyclohexanone as the diluent instead of methyl ethyl ketone, the viscosity was greater than 2,000,000 cps. Clearly, cyclohexanone is not an acceptable diluent.

EXAMPLE 13

The adhesive performance of a dispersion polymer prepared by the process of Example 1 is compared to a well-known commercial solution polymer in TABLE IV:

TABLE IV

|  | Example 1 | Aroset 1085 (Ashland Chemical Co.) |
|---|---|---|
| % Solids | 54.9 | 48.9 |
| Viscosity (cps) | 5,300 | 28,000 |
| Williams Plasticity (mm) | 3.06 | 2.50 |
| Shear strength[1] (min) | >8000 | 5417 |
| 180° peel adhesion[2] (g/in) |  |  |
| 0 minute contact time | 934 | 464 |
| 72 hour contact time | 2132 | 1653 |
| Rolling Ball tack[3] (in) | 0.9 | 0.5 |
| Polyken probe tack (g/sq. cm.) | 832 | 674 |

[1]PSTC test 7, polyester film to stainless steel, one square inch contact area. 1 kilogram load. Adhesive deposit-1 oz/sq yard.
[2]PSTC test 1, polyester film to stainless steel
[3]PSTC test 6.

It is clear from the above comparison that the dispersion polymers produced by the process of the present invention are not only superior in performance to conventional solution polymers but additionally have the advantage of low viscosity and higher solids content.

The invention in its broader aspects is not limited to the specific described embodiments or examples and departures may be made therefrom within the scope of the accompanying claims without departing from the principles of the invention and without sacrificing its chief advantages.

What is claimed is:
1. A polymerization process for preparing a stable dispersed polymer in a non-aqueous diluent which comprises polymerizing in a polar, aliphatic organic diluent
    (a) at least one ethylenically unsaturated monomer capable of free radical addition polymerization;
    (b) a polar monomer having a functional group selected from the group consisting of unsaturated carboxylic acids and substituted alkyl (meth)acrylate derivatives; and

(c) a polymeric monomer consisting of a linear, uniform molecular weight polymer having a polymerizable, ethylenically unsaturated group capable of polymerization with the ethylenically unsaturated monomer by a free radical addition process.

2. The process according to claim 1, wherein (a) is a monomer selected from the group consisting of esters of unsaturated acids, vinyl esters of carboxylic acids, and acrylonitrile.

3. The process according to claim 1, wherein (c) is a polymerizable homopolymer prepared by polymerization of an anionically polymerizable monomer and terminated by reaction with a halogen-containing compound containing a polymerizable moiety.

4. The process according to claim 3, wherein the polymeric monomer is comprised of an acrylate ester of polystyryl alcohol having a molecular weight of from about 4000 to 50,000.

5. The process according to claim 3, wherein the polymeric monomer is comprised of a methacrylate ester of polystyryl alcohol having a molecular weight of from about 4000 to 50,000.

6. The process according to claim 1, wherein the polymeric monomer comprises at least 5% by weight of the total weight of said dispersion polymer.

7. The process according to claim 1, wherein the polar monomer comprises at least 5% by weight of the total weight of said dispersion polymer.

8. The process according to claim 1, wherein the diluent is a polar solvent selected from the group consisting of aliphatic ketones and alcohols.

9. The process according to claim 1, wherein free radical polymerization is initiated by a free radical catalyst of the azo or peroxygen type.

10. The process according to claim 1, wherein the dispersed polymer is stablized in the diluent by hydrogen bonding between the diluent and polar groups on the surface of the dispersed polymer.

11. The process according to claim 10, wherein the source of disposed polymer polar groups for hydrogen bonding with the diluent is the polar monomer.

12. The process according to claim 1, wherein the polar monomer is selected from the group consisting of acrylic acid, methacrylic acid, maleic acid, itaconic acid, aminoalkyl acrylate, hydroxyalkyl acrylate, aminoalkyl acrylate and hydroxyalkyl methacrylate.

13. A polymerization process for preparing a stable dispersion of polymer in a non-aqueous diluent which comprises polymerizing in a polar, aliphatic organic diluent:
   (a) 75–90wt % of at least one ethylenically unsaturated monomer capable of free radical addition polymerization selected from the group consisting of esters of acrylic acid, methacrylic acid, and maleic acid; vinyl acetate, acrylonitrile and methacrylonitrile;
   (b) 5–10wt % of a polar monomer having a functional group selected from the group consisting of unsaturated carboxylic acids and substituted (meth)acrylate derivatives; and
   (c) 5–15wt % of a polymeric monomer consisting of a linear uniform molecular weight polymer having a polymerizable unsaturated group capable of polymerization with the ethylenically unsaturated monomer by a free radical addition process, said polymeric monomer prepared by polymerization of an anionically polymerizable monomer and terminated by reaction with a halogen-containing compound having a polymerizable moiety.

14. The process of claim 13 in which the ethylenically unsaturated monomer is at least one ester of acrylic acid.

15. The process of claim 14 in which the ethylenically unsaturated monomer is 2-ethylhexyl acrylate.

16. The process of claim 13 in which the ethylenically unsaturated monomer comprises 2-ethylhexyl acrylate and vinyl acetate.

17. The process of claim 15 in which the polar monomer is acrylic acid.

18. The process of claim 17 in which the polymeric monomer is a methacrylate ester of polystyryl alcohol.

19. The process of claim 18 in which the polar, aliphatic organic diluent is methylethyl ketone.

20. The process of claim 19 in which the diluent also contains toluene.

* * * * *